United States Patent
Krupka et al.

(10) Patent No.: US 8,983,210 B2
(45) Date of Patent: Mar. 17, 2015

(54) SOCIAL NETWORK SYSTEM AND METHOD FOR IDENTIFYING CLUSTER IMAGE MATCHES

(75) Inventors: Eyal Krupka, Shimshit (IL); Igor Abramovski, Haifa (IL); Igor Kviatkovsky, Haifa (IL)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/784,500

(22) Filed: May 21, 2010

(65) Prior Publication Data

US 2011/0211764 A1 Sep. 1, 2011

Related U.S. Application Data

(60) Provisional application No. 61/309,059, filed on Mar. 1, 2010.

(51) Int. Cl.
  *G06K 9/62* (2006.01)
  *G06F 17/30* (2006.01)
  *G06K 9/00* (2006.01)

(52) U.S. Cl.
  CPC .... *G06F 17/30247* (2013.01); *G06F 17/30265* (2013.01); *G06K 9/00677* (2013.01)
  USPC .......... 382/225; 382/103; 382/118; 382/224; 382/305

(58) Field of Classification Search
  None
  See application file for complete search history.

(56) References Cited

U.S. PATENT DOCUMENTS

| | | | | |
|---|---|---|---|---|
| 7,058,209 B2 * | 6/2006 | Chen et al. | | 382/117 |
| 7,587,068 B1 | 9/2009 | Steinberg et al. | | |
| 8,284,990 B2 * | 10/2012 | Ma et al. | | 382/103 |
| 2003/0128877 A1 * | 7/2003 | Nicponski | | 382/224 |
| 2003/0210808 A1 * | 11/2003 | Chen et al. | | 382/118 |
| 2005/0105806 A1 | 5/2005 | Nagaoka et al. | | |
| 2005/0232495 A1 * | 10/2005 | Katoh et al. | | 382/225 |
| 2007/0237364 A1 | 10/2007 | Song et al. | | |
| 2007/0250476 A1 * | 10/2007 | Krasnik | | 707/2 |
| 2008/0089561 A1 * | 4/2008 | Zhang | | 382/118 |
| 2008/0226174 A1 * | 9/2008 | Hua et al. | | 382/190 |

(Continued)

FOREIGN PATENT DOCUMENTS

WO 2009082814 A1 7/2009

OTHER PUBLICATIONS

Bradymedia, FREE Face Recognition API, Face Recognition Software Apps for the masses-face.com, Twittweb, Mar. 24, 2009, pp. 1-14, available at http://twittweb.com/business+rumors+surroun-21247785.*

(Continued)

*Primary Examiner* — Jayesh A Patel
(74) *Attorney, Agent, or Firm* — Steve Wight; Judy Yee; Micky Minhas

(57) ABSTRACT

A social network application may identify images having common links between a first user's image collection and a second user's image collection. The common links may be identified through metadata or similar portions of the images. Using the first user's image collection, elements of interest may be identified and compared to a second user's image collection to find matches. When matches are found, the results may be selected from groups of results to show a diverse set of matches. The user may be presented with options to select and add matched images to the user's collection, as well as to browse more images that match one or more of the groups.

19 Claims, 12 Drawing Sheets

(56) References Cited

U.S. PATENT DOCUMENTS

| | | | | |
|---|---|---|---|---|
| 2009/0180671 | A1* | 7/2009 | Lee et al. | 382/118 |
| 2010/0014721 | A1* | 1/2010 | Steinberg et al. | 382/118 |
| 2010/0277611 | A1* | 11/2010 | Holt et al. | 348/231.2 |
| 2010/0287053 | A1* | 11/2010 | Ganong et al. | 705/14.66 |
| 2011/0040756 | A1* | 2/2011 | Jones et al. | 707/737 |

OTHER PUBLICATIONS

Roi Carthy, Face.com Brings Facial Recognition to Facebook Photos (We Have Invites), Tech Crunch, Mar. 24, 2009; pp. 1-6, available at http://techcrunch.com/2009/03/24/facecom-brings-facial-recognition-to-facebook-photos-we-have-invites/.*

Roi Carthy, It's Bulk Facebook Photo Tagging Time with Face.com Photo Tagger (Invites), Tech Crunch, Jul. 21, 2009; pp. 1-6, available at http://techcrunch.com/2009/07/21/its-facebook-photo-tagging-time-with-facecom-photo-tagger/.*

Kristen Nicole, Photo Tagger Automatically Tags Your Facebook Photos, AllFacebook, Jul. 21, 2009, pp. 1-5, available at http://allfacebook.com/photo-tagger_b6803.*

Face.com, Wikipedia, pp. 1-3, available at http://en.wikipedia.org/wiki/Face.com.*

Facebook 101 How to Manual, Grand Valley State University, 2009, pp. 1-32.*

"Microsoft OneAlbum", Retrieved at <<http://www.liveside.net/main/archive/2010/03/04/microsoft-onealbum-fusing-facial-recognition-and-social-networks-the-future-of-windows-live-photos.aspx>>, Mar. 4, 2010, pp. 5.

Lai, et al., "Design and Implementation of an Online Social Network with Face Recognition", Retrieved at <<http://www.academypublisher.com/ojs/index.php/jait/article/viewFile/01013842/1575 >>, Journal of Advances in Information Technology, vol. 1, No. 1, Feb. 2010, pp. 38-42.

Eldon, Eric., "Find Untagged Photos of your Facebook Friends with Face.com's Photo Finder", Retrieved at <<http://venturebeat.com/2009/03/24/find-untagged-photos-of-your-facebook-friends-with-facecoms-photo-finder/ >>, Mar. 24, 2009, pp. 5.

Shankland, Stephen., "Google Picasa", Retrieved at <<http://news.cnet.com/8301-13580_3-10026577-39.html>>, Sep. 2, 2008, pp. 5.

* cited by examiner

SOCIAL NETWORK SYSTEM AND METHOD FOR IDENTIFYING CLUSTER IMAGE MATCHES

CROSS REFERENCE TO RELATED APPLICATIONS

This patent application claims priority to and the benefit of U.S. Provisional Patent Application Ser. No. 61/309,059 entitled "Social Network System with Recommendations" filed 1 March 2010 by Eyal Krupka, et. al., the entire contents of which are hereby expressly incorporated by reference.

BACKGROUND

Social networks are applications that allow users to share personal and professional information with friends. In many instances, social networks may allow users to post photographs, videos, and other content to be shared with their network of friends or associates.

SUMMARY

A social network application may identify images having common links between a first user's image collection and a second user's image collection. The common links may be identified through metadata or similar portions of the images. Using the first user's image collection, elements of interest may be identified and compared to a second user's image collection to find matches. When matches are found, the results may be selected from groups of results to show a diverse set of matches. The user may be presented with options to select and add matched images to the user's collection, as well as to browse more images that match one or more of the groups.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
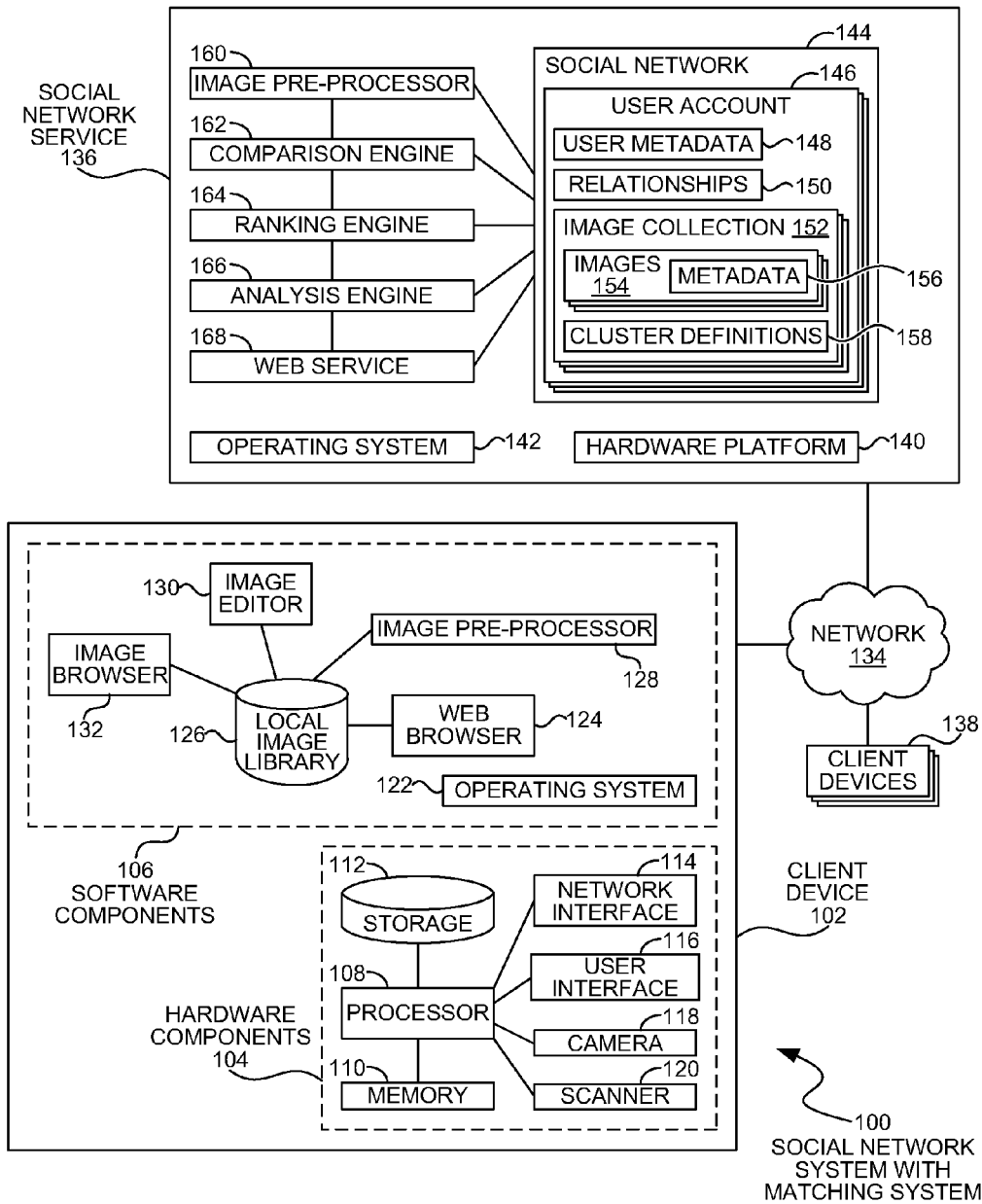
FIG. 1 is a diagram illustration of an embodiment showing an system with a social network and image matching system.

A social network application may find images in other user's image collections that may be relevant to a first user. The images may be found by creating clusters that represent the images in the first user's image collection. In some embodiments, images may be clustered on several orthogonal axes and independently analyzed on each axis. Comparisons between one image and the clusters may be performed by calculating a 'distance' between the image and a centroid of a cluster as well as to an image that may be a nearest neighbor.

The size of the clusters may be used as a general measure of the relative importance of each cluster. When a set of image results are presented to a user, images representing matches to each cluster may be included in the user interface according to the cluster size.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a client and server components for a social network. Embodiment 100 is a simplified example of a network environment that may include a client device and a social network service accessed through a network.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates an example of a social network in which a user may have collection of images. The social network may be a web application in which various users may establish accounts in the social network and may manage image collections within the social network. A service operating within the social network infrastructure may analyze and compare the image collections.

The social network of embodiment 100 may be any type of social network in which express or implied relationships may exist between users. In some social networks, the relationships may be expressed by one user formally establishing a relationship with another user. Some social network may establish a one-way relationship through such a relationship declaration, while other social networks may establish a relationship when both users approve the relationship.

Some social networks may have informal relationships between users. For example, an informal relationship may be established when two users exchange email messages, or when the users communicate using another mechanism. For example, a social network may be established for users who communicate in a chat room, instant messaging service, or other mechanism. In some cases, a person's list of contacts in an email system or a mobile telephone may be used as an implied relationship for the purposes of establishing a social network relationship.

In some social networks, a user may determine how images within their image collections may be shared. In some cases, a user may select images that may be sharable to friends for which a relationship exists. In other cases, a user may permit any user with which to share images.

The social network may be a formal social network in which each user may create an account to access the social network. In many such embodiments, the users may access the social network through a web browser, and the social network may be a web application. In many such embodiments, a user may upload images to create an image collection inside the social network environment.

In less formal versions of a social network, a user may store and manage an image collection on a personal computer or in repositories that are personally controlled or managed by the user. In such a social network, the user may identify various storage locations from which images may be shared with other people. In some such social network, the social network relationships may be maintained using infrastructure that may be merely an address exchange, forum, or other mechanism by which members may connect with each other.

The client device 102 may have a set of hardware components 104 and software components 106. The client device 102 may represent any type of device that may communicate with a social network service 136.

The hardware components 104 may represent a typical architecture of a computing device, such as a desktop or server computer. In some embodiments, the client device 102 may be a personal computer, game console, network appliance, interactive kiosk, or other device. The client device 102 may also be a portable device, such as a laptop computer, netbook computer, personal digital assistant, mobile telephone, or other mobile device.

The hardware components 104 may include a processor 108, random access memory 110, and nonvolatile storage 112. The hardware components 104 may also include one or more network interfaces 114 and user interface devices 116. In many cases, the client device 102 may include cameras 118 or scanners 120 that may capture images that may become part of a user's image collection.

The software components 106 may include an operating system 112 on which various applications may execute, such as a web browser 124. In many social networking applications, a web browser 124 may be used to communicate with a social network service 136 to access a social network application. In other embodiments, a specialized client application may communicate with a social network service to provide a user interface. In some such embodiments, such a client application may perform many functions that may be described in the social network service 136.

The client device 102 may have a local image library 126 that may include images that are collected from many different sources, such as a camera 118, scanner 120, or other devices that may have image capture capabilities. The local image library 126 may include images that are stored on other devices, such as a server within a local area network or within a cloud storage service, for example.

The client device 102 may have several applications that may allow a user to view and manage the local image library 126. Example of such applications may be an image editor 130 and image browser 132. In some cases, a client device may have several such applications.

The local image library 126 may include both still images and video images. In some embodiments, still images and video images may be stored in different libraries and may be accessed, edited, and manipulated with different applications.

In some embodiments, the client device 102 may have an image pre-processor 128. The image pre-processor may analyze the image contents as well as various metadata associated with the image prior to associating the image with a social network. The pre-processing may perform facial image analysis, background analysis, color histograms, or other analyses on images available to the client. In other embodiments, some or all of the functions performed by the image pre-processor 128 may be performed by the social network service 136. When an image pre-processor 128 is located on the client device 102, a server device may be offloaded from performing such operations.

The client device 102 may connect to the social network service 136 through a network 134. In some embodiments, the network 134 may be a wide area network, such as the Internet. In some embodiments, the network 134 may include a local area network which may be connected to a wide area network through a gateway or other device.

In some embodiments, the client device 102 may connect to the network 134 through a hard wired connection, such as an Ethernet connection, for example. In other embodiments, the client device 102 may connect to the network 134 through a wireless connection, such as a cellular telephone connection or other wireless connection.

Various users of the social network may connect using various client devices 138.

The social network service 136 may operate on hardware platform 140. The hardware platform 140 may be a single server device that has a hardware platform similar to the hardware components 104 of the client device 102. In some embodiments, the hardware platform 140 may be a virtualized or cloud based hardware platform that operates on two or more hardware devices. In some embodiments, the hardware platform may be a large datacenter in which many hundreds or thousands of computer hardware platforms may be used.

The social network service 136 may operate within an operating system 142 in some embodiments. In embodiments that have cloud based execution environments, the notion of a separate operating system 142 may not exist.

The social network 144 may include multiple user accounts 146. Each user account 146 may include metadata 148 relating to the account, as well as relationships 150 that may be established between two or more users.

The user account metadata 148 may include information about the user, such as the user's name, home address, location, as well as the user's likes and dislikes, education, and other relevant information. Some social networks may have emphasis on work related information, which may include items like work history, professional associations, or other job-related information. Other social networks may emphasize friends and family relationships where personal items may be emphasized. In some social networks, very large amounts of personal metadata 148 may be included, while other social networks may have very little amount of personal metadata 148.

The relationships 150 may associate one user account to another. In some embodiments, the relationships may be one-way relationships, where a first user may share information with a second user but the second user may not reciprocate and may share no information or a limited amount of information with the first user. In other embodiments, the relationships may be two-way relationships where each user agrees to share information with each other.

In still other embodiments, a user may allow some or all of their information to be shared to anyone, including people who are not members of the social network. Some such embodiments may allow a user to identify a subset of information that may be shared to anyone, as well as subsets that may be shared with other members of the social network. Some embodiments may allow a user to define subsets that are shared with different groups of social network members.

Each user account 146 may include one or more image collections 152. The image collections 152 may include images 154. Each image 154 may include metadata 156, which may be general metadata such as timestamp, location information, image size, title, and various tags. The tags may include identifiers for different social network members to which the image may relate.

In some embodiments, the image metadata 156 may contain metadata derived from the image contents. For example, a facial analysis may be performed to identify any faces within the image and to create a facial representation or facial vector. The facial representation may be used to compare with other images, for example. Other image contents that may be used to derive metadata may include texture analysis of background areas or a person's clothing, color histograms of the entire image or portions of the image, or other analyses.

The image metadata 156 may be used to create clusters 158. The clusters 158 may be groupings of images or elements from images. For example, facial representations may be analyzed to identify clusters that contain similar facial representations. Similarly, clusters may be created by grouping image analysis results from background areas of the images.

In some embodiments, clusters 158 may be created by grouping images based on metadata. For example, several images that are taken during a certain time period may be grouped together as a cluster, or images that are tagged with the same tag parameter may form a cluster. Examples of uses clusters may be found in embodiments 1100 and 1200 presented later in this specification.

In some embodiments, the social network service 136 may include an image pre-processor 160 that may analyze images to derive image metadata. The image pre-processor 160 may be used for instances where a client device 102 may not have an image pre-processor 128 or when image pre-processing is not performed prior to analysis. An example of the pre-processing steps may be illustrated in embodiment 500 presented later in this specification.

A comparison engine 162 may compare two or more images using image analysis techniques or metadata analysis to determine the clusters 158. An example of the operations of a comparison engine 162 may be found in portions of embodiment 400 presented later in this specification.

A ranking engine 164 may compare the various clusters 158 to extract information, such as the ranking or importance of the images or information attached to the images. An example of the operations of a ranking engine 164 may be found in embodiment 300 presented later in this specification.

An analysis engine 166 may analyze and compare image collections to identify matches between the image collections. The analysis engine 166 may use metadata analysis and image content analysis to identify matches.

In many embodiments, a social network service 136 may operate with a web service 168 that may communicate with browsers or other applications operable on a client device. The web service 168 may receive requests in Hyper Text Transmission Protocol (HTTP) and respond with web pages or other HTTP compliant responses. In some embodiments, the web service 168 may have an application programming interface (API) through which an application on a client device may interact with the social network service.

Figure 2:
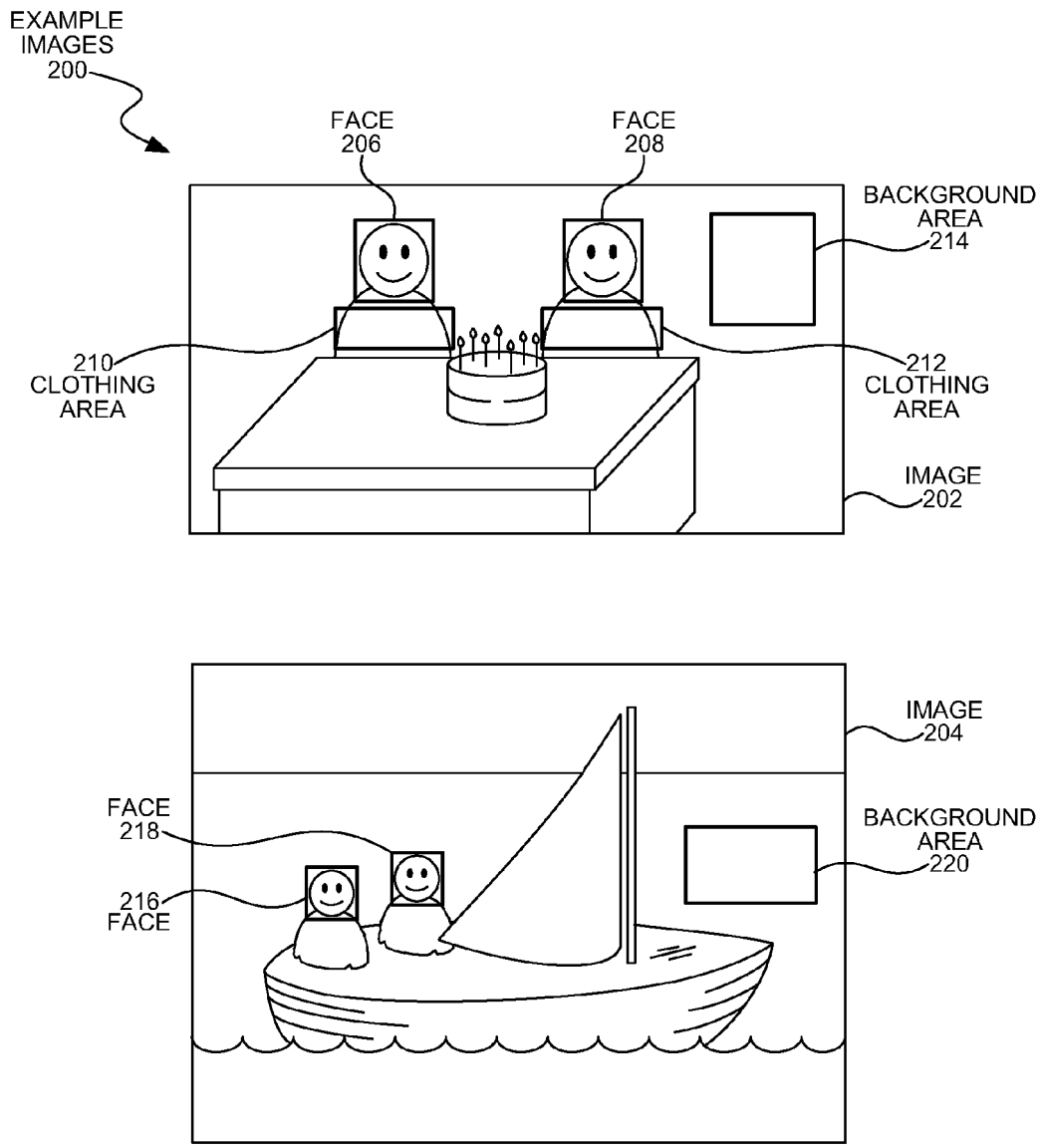
FIG. 2 is a diagram illustration of an example embodiment showing example images.

FIG. 2 is a diagram of an example embodiment 200, showing two images that may be analyzed by image analysis.

Embodiment 200 illustrates two images 202 and 204 that show a birthday party and a sailing excursion, respectively. The images may represent example images that may be found in a user's image collection.

Image 202 may represent a birthday party with two people. From the image 202, two faces 206 and 208 may be identified. Several different facial recognition mechanisms or algorithms may be used to identify the faces 206 and 208.

Once identified, the faces 206 and 208 may be processed to create representations of the faces. The representations may be facial vectors or other representations that may allow numerical comparisons of different faces to each other.

In some embodiments, additional image analyses may be performed. For example, the clothing areas 210 and 212 may be identified by determining a geometrical relationship from the faces 206 and 208, respectively, and capturing a portion of an image that may relate to the clothing being worn by the respective people.

Image analysis of clothing may be used to compare two images to determine if those images were taken at the same event. Such a conclusion may be drawn when two images contain similar faces and the images additionally contain similar clothing textures or color histograms. Such an analysis may assume that the images represent the same event because the people in the images may be wearing the same clothes.

Additionally, a background area 214 may be analyzed for texture analysis, color histogram, or other analyses. Such results may be compared to other images to determine similarities and matches between the images.

In the image 204, the faces 216 and 218 may be identified and captured. Because the size of the faces 216 and 218 may be relatively small, the clothing areas for the people of image 204 may not be performed, but a background area 220 may be identified and analyzed.

Figure 3:
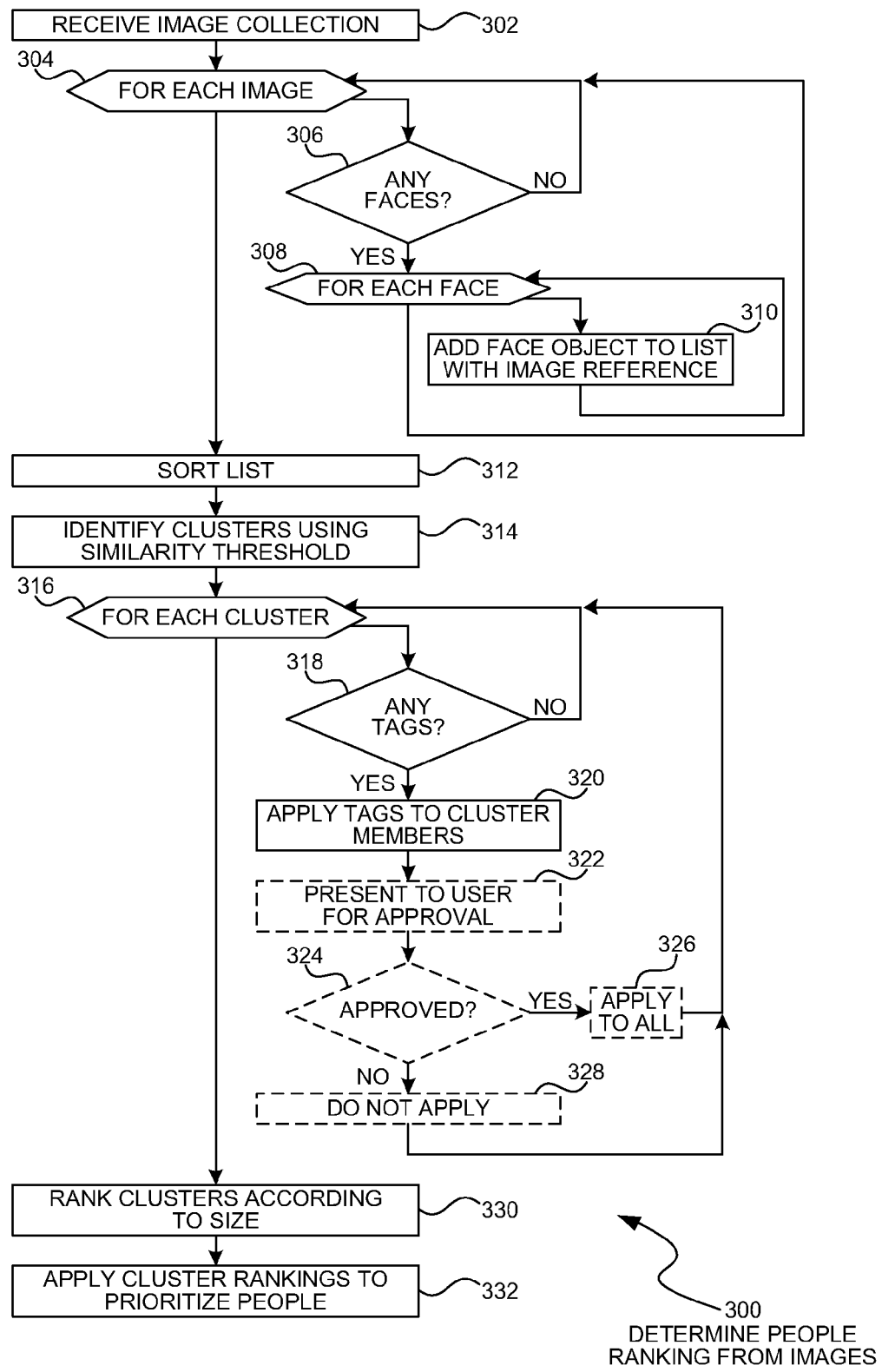
FIG. 3 is a flowchart illustration of an embodiment showing a method for determining people rankings from images.

FIG. 3 is a flowchart illustration of an embodiment 300 showing a method for determining people rankings from an image collection. Embodiment 300 is an example of a method that may be performed by a comparison engine and ranking engine, such as comparison engine 162 and ranking engine 164 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 may be an example of a method by which the number of occurrences of a person's face in a user's image collection may be used as an approximation of the user's interest in the person or the importance of the person to the user.

The faces within the images may be analyzed, compared, and grouped together into clusters. Based on the size of the clusters, the persons associated with the clusters may be ranked.

An image collection may be received in block 302. The image collection may be pre-processed to identify faces and facial representations. An example of such a pre-processing method may be illustrated in embodiment 500 presented later in this specification.

Each image may be processed in block 304. For each image in block 304, if no faces exist in block 306, the process may return to block 304 to process the next image. If one or more faces appear in the image in block 306, each face may be separately processed in block 308. For each face in block 308, the face object and the associated image reference may be added to a list in block 310. The image reference may be a pointer or other indicator for the image from which the face is taken.

After processing all of the images in block 304, the resulting list may be sorted in block 312.

In block 314, the list may be analyzed to identify clusters based on a threshold value in block 314. The clusters may define a group of facial representations that relate to a single person.

One mechanism to determine a cluster may be to consider a facial representation as a vector. The similarity between any two vectors may be considered a distance in the vector space. When multiple facial representations reflect many different images of the same person, the facial representation vectors may create clusters of vectors.

In many embodiments, a threshold may be used as part of a mechanism to determine whether or not a given facial representation is 'close' to another facial representation to be a match. The threshold may be determined in several different manners, and one such manner may be illustrated in embodiment 600.

Each cluster may be analyzed in block 316. For each cluster in block 316, if any members of the cluster do not have tags or other associated metadata in block 318, the process may return to block 316 to process another cluster.

If one or more of the members of the cluster in block 318 contains tags or other metadata, those tags may be applied to other cluster members in block 320. In some cases, the user may be presented with a user interface device in block 322 where the user may approve or disapprove the tags. If the user approves the tags in block 324, the tags may be applied to all members of the cluster in block 326. If the user does not approve the tags in block 324, the tags may not be applied to the members in block 328.

In many social network applications, users may tag images with identifiers for specific people, for example. The process of blocks 316 through 328 may represent a method by which such tags may be applied to other images automatically. In some embodiments, the tags applied to the members of the cluster may be tags that relate to the person the cluster may represent. A simple example may be a tag that defines the person's name.

The clusters may be analyzed in block 330 to rank the clusters according to size. The ranking may reflect the relative importance of the people to the user. The cluster rankings may be used in block 332 to prioritize people in various applications.

For example, a newsfeed may include messages, status updates, or other information that relate to people in a user's social network. Those items relating to important people may be highlighted or presented in a manner that captures the user's attention. Other items concerning people who do not appear often in the user's image collection may be presented in a secondary or non-emphasized manner.

Figure 4:
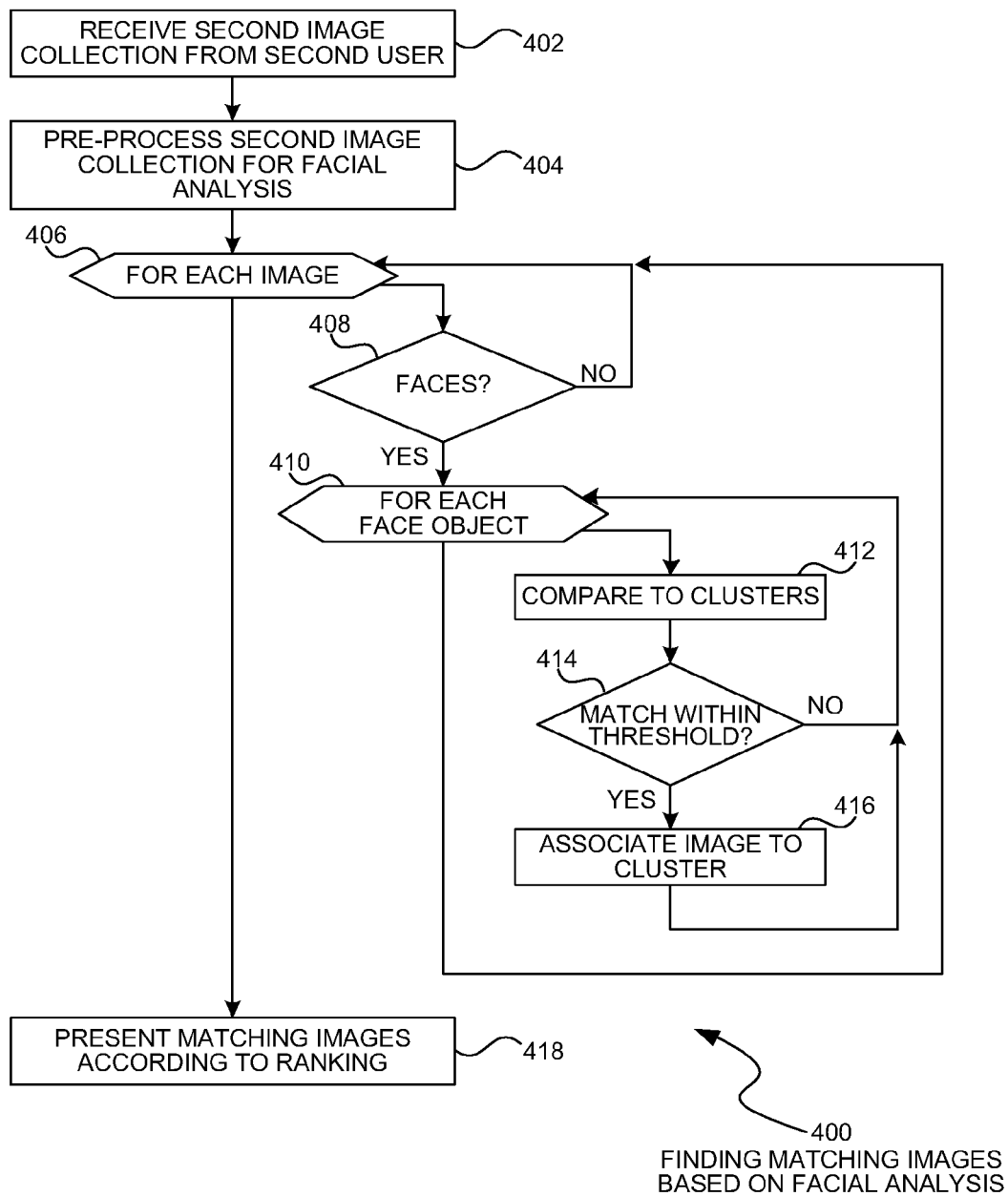
FIG. 4 is a flowchart illustration of an embodiment showing a method for finding matching images based on facial analysis.

FIG. 4 is a flowchart illustration of an embodiment 400 showing a method for finding matching images based on facial analysis. Embodiment 400 is an example of a method that may be performed by a comparison engine, such as analysis engine 166 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an example of a method by which images from a second image collection may be compared to a first image collection to identify images in the second image collection that contain the same people as the first image collection.

A second image collection may be received in block 402. The second image collection may be pre-processed in block 404. One example of a method for pre-processing may be illustrated in embodiment 500 presented later in this specification.

Each image in the second image collection may be processed in block 406. For each image in block 406, if no faces are found in block 408, the process may return to block 406 to process the next image.

If faces are found in block 408, each face object may be processed in block 410. For each face object in block 410, a comparison may be made to the clusters of the first image collection in block 412 to find the closest match. If the match does not meet the threshold in block 414, the process may return to block 410 to process the next face object. If the match is within the threshold in block 414, the image is associated to the cluster in block 416.

After processing all of the images in block 406, the result may be a list of images from the second image collection that match clusters in the first image collection. The list may be ranked in block 418 according to the ranking that may be determined from the process of embodiment 300, and presented to the user.

Figure 5:
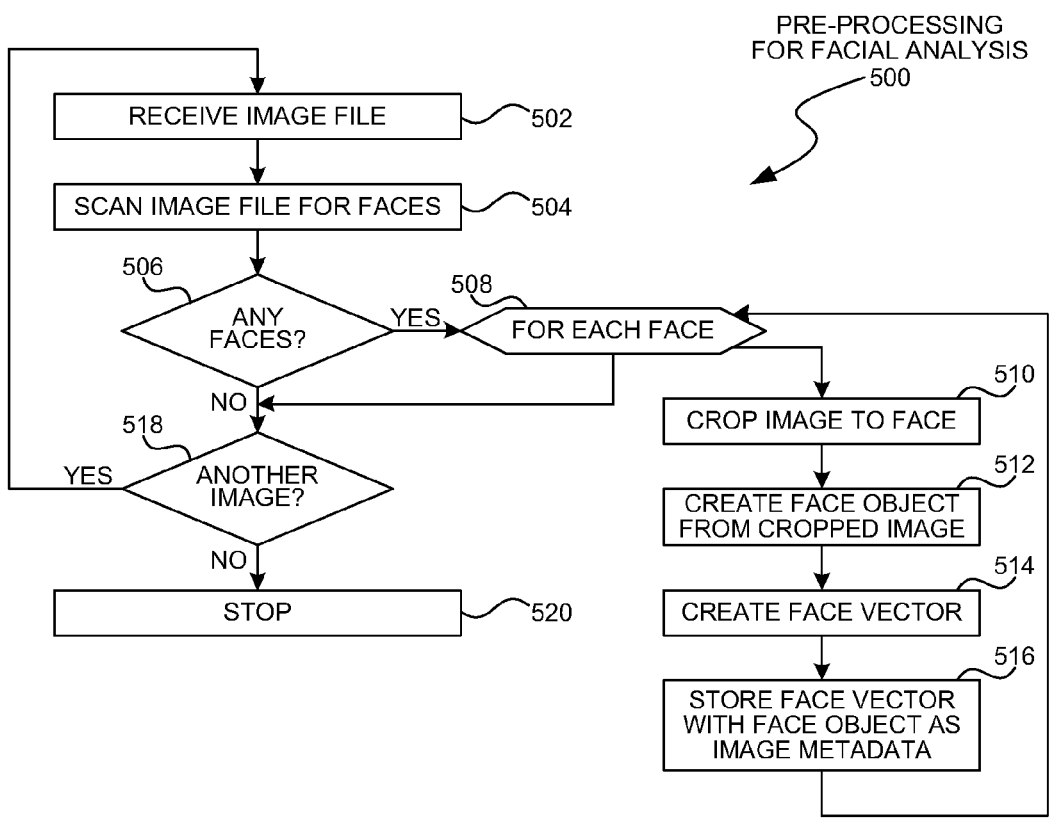
FIG. 5 is a flowchart illustration of an embodiment showing a method for pre-processing for facial analysis.

FIG. 5 is a flowchart illustration of an embodiment 500 showing a method for pre-processing images for facial analysis. Embodiment 500 is an example of a method that may be performed by an image pre-processor, such as the image pre-processor 128 of client 102 or image pre-processor 160 of a social network service 136 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The pre-processing of embodiment 500 may identify faces and create face vectors or some other numerical representation of a facial image for all images in an image collection.

An image file may be received in block 502 and may be scanned in block 504 to identify all faces.

If faces are found in block 506, each face may be separately processed in block 508. For each face in block 508, the image may be cropped to the face in block 510 and a face object may be created from the cropped image in block 512. A face vector may be created in block 514 which may be a numerical representation of the face image. The face vector and face object may be stored as metadata for the image in block 516.

After all the faces are processed in block 508, if another image is available in block 518, the process may loop back to block 502, otherwise the process may stop in block 520.

Figure 6:
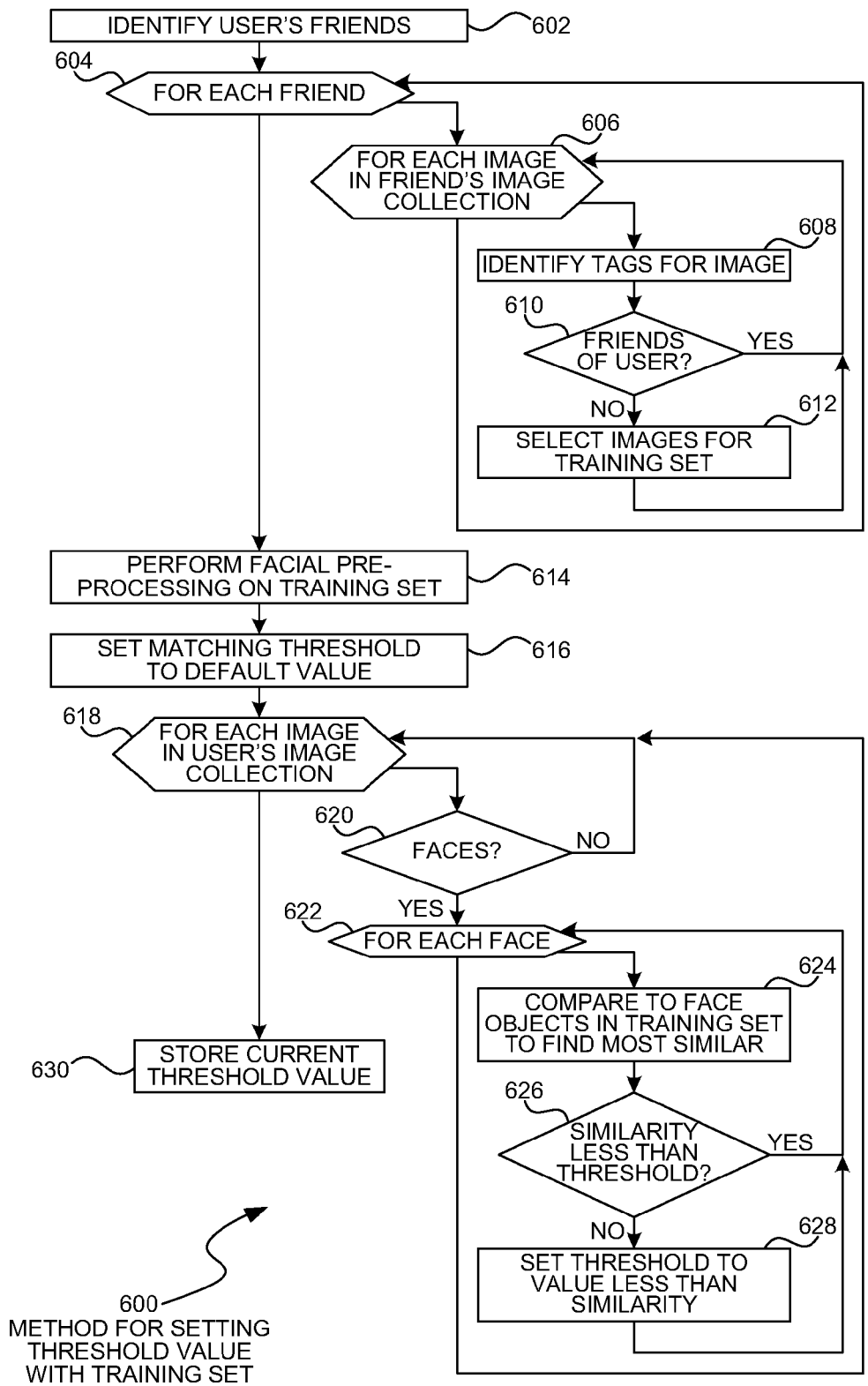
FIG. 6 is a flowchart illustration of an embodiment showing a method for setting a threshold value with a training set.

FIG. 6 is a flowchart illustration of an embodiment 600 showing a method for setting a threshold value using a training set of images. Embodiment 600 is an example of a method that may gather example images from friends of a user and use those example images to set a threshold that may minimize false positive comparisons.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may determine a threshold setting that may minimize false positive comparisons when comparing image collections. In many social network applications, a relatively high confidence threshold may be useful to minimize the likelihood of incorrectly identifying a match. When selecting photographs or video images from a second user's image collection to match a first user's image collection, an incorrect match may give a user a low confidence in the matching process. However, a missed match, where the match exists but the threshold does not permit the match to be detected, may not be as detrimental to the user's confidence.

The process of embodiment 600 gathers representative images from a user's friend's image collection to serve as a training set for comparisons. Facial comparisons may differ based on race, skin color, and other physical characteristics of those people associated with the user. The images selected may be from the user's friend's friends, and may reflect the probable physical characteristics of the people in the user's image collection.

The process of embodiment 600 may attempt to remove any people from the training set who may be likely to be in the user's image collection. This may be performed by examining any tags associated with the friend's images to ensure that the tags do not match the user's friends.

The user's friends may be identified in block 602. The user's friends may be determined from relationships within the social network, as well as any other source. In some cases, a user may belong to several social networks, each with a different set of relationships. In such cases, as many of those relationships may be considered as possible.

Each of the user's friends may be processed in block 604. For each friend in block 604, each image in the friend's image collection is processed in block 606. For each image in block 606, the tags associated with the image may be identified in block 608. If the tags are associated with friends of the user in block 610, the image is not considered in block 610. By excluding the friends of the user in block 610, the training set may not include images that are likely to be matches for the user, but may include images of people having similar characteristics as people likely to be in the user's image collection.

If the tags indicate that the image may not be related to the user in block 610, the image may be selected for the training set in block 612. In many cases, the images selected for the training set may be a subset of all of the images in the friend's image collection. For example, a process may select one out of every 100 or 1000 candidate images as part of a training set. In some embodiments, a random selection may be made for the training set.

After selecting images to be in a training set in blocks 604 through 612, a facial pre-processing may be performed on the training set in block 614. The pre-processing may be similar to that of embodiment 500.

The matching threshold may be set to a default value in block 616.

Each image of the user's image collection may be processed in block 618 to set the threshold so that none of the images in the user's image collection match the training set. For each image in block 618, if the image does not contain faces in block 620, the process returns to block 618.

When the image contains faces in block 620, each face may be processed in block 622. For each face in block 622, the face object may be compared to face objects in the training set find the most similar face object in block 624. If the similarity is less than the threshold in block 626, the process may return to block 622. If the similarity is greater than the threshold in block 626, the threshold is adjusted in block 628 so that the threshold is lower than the similarity in block 628.

After processing all of the images in the user's image collection in block 618, the current threshold value may be stored in block 630 and used for subsequent comparisons.

Figure 7:
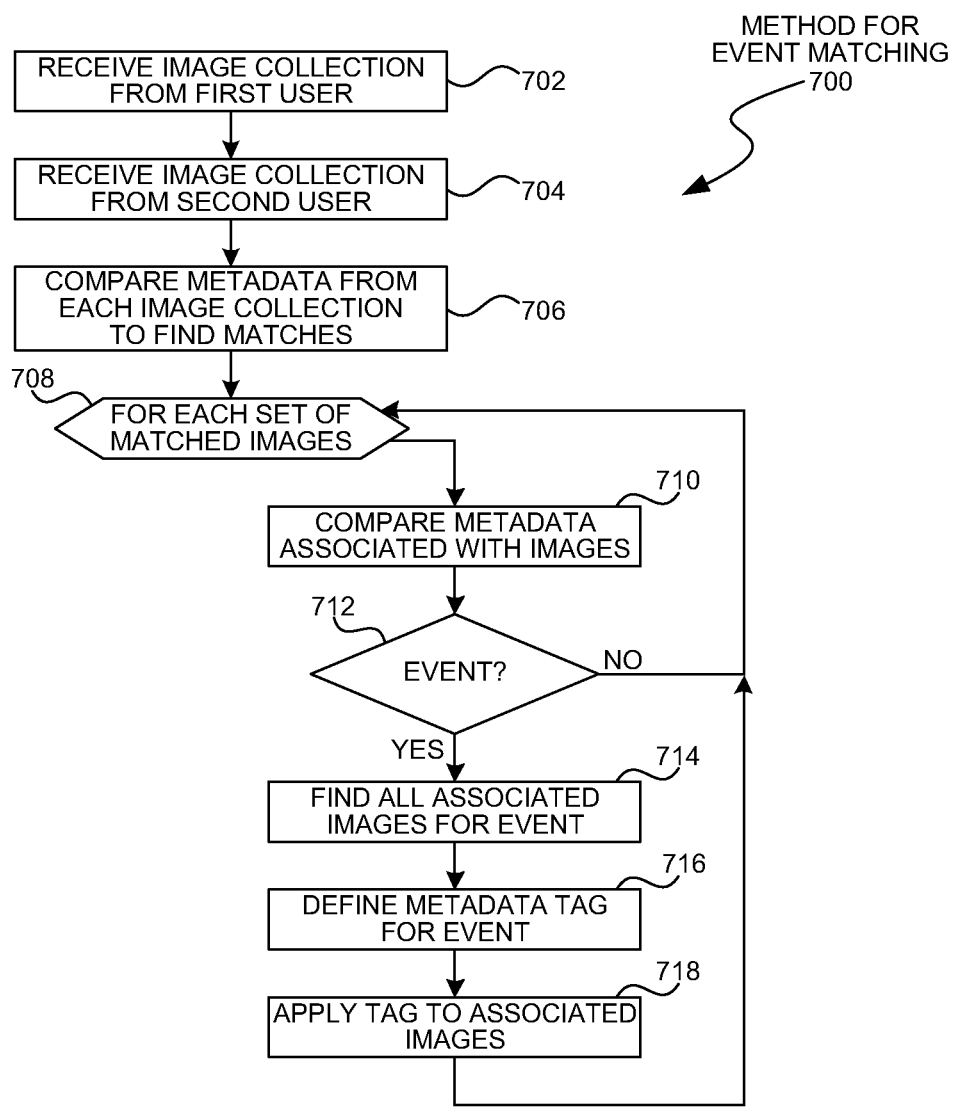
FIG. 7 is a flowchart illustration of an embodiment showing a method for event matching.

FIG. 7 is a flowchart illustration of an embodiment 700 showing a method for event matching. Embodiment 700 is a simplified example of a method that may be performed by an analysis engine, such as the analysis engine 166 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 is an example of a method that may be used to detect an event from metadata. The metadata may be metadata that may be derived from an image, such as from facial analysis or other image analysis. The metadata may also be metadata that is not derived from the image, such as a title, timestamp, or location information.

Embodiment 700 may infer an event from the intersection of the image collections of two users. Such an intersection may occur when both users attend the same event and both take images of the event. For example, two users may attend a birthday party or family gathering and take pictures of a family gathered for a meal. In another example, two users may attend a conference, sporting event, or other public event and may take images of the gathering. In some cases, the users may know about each other's attendance of the event and in other cases, the users may be unaware that the other person has attended.

In block 702, an image collection may be received from a first user. In block 704, an image collection may be received from a second user. In some embodiments, the information received may be just the metadata related to the images in the collection and not the actual images themselves.

The metadata from each image collection may be compared in block 706 to find matches. The matches may be based on image analysis, such as finding matching faces in images from two different collections. The matches may be based on metadata analysis, such as finding images that have timestamps, tags, location information, or other metadata that are matches.

In many cases, the matches may be determined with some level of tolerance or variance. The matches identified in block 706 may have a large amount of variance or tolerance, as each match may be further evaluated in later steps. The matching in block 706 may be a coarse or preliminary matching that may be further refined to identify a match with greater certainty.

The results of block 706 may be a pair of images from each collection. In some cases, the results may be a group of images from each collection that share similar metadata.

Each set of matched images may be compared in block 708. For each set of matched images in block 708, the metadata may be compared in block 710 to determine if an event can be inferred.

An event may be inferred based on several factors. Some factors may be weighted highly, while other factors may be of a secondary nature. The determination of whether a match indicates an event or not may be determined using various heuristics or formulas, and such heuristics or formulas may depend on the embodiment. For example, some embodiments may have extensive metadata available, while other embodiments may have fewer metadata parameters. Some embodiments may have sophisticated image analysis while other embodiments may have less sophisticated or even no image analysis.

A highly weighted factor may be in cases where the second user identifies the first user in one of the second user's images. Such metadata expressly identifies a link between the two image collections and indicates that both users were likely to be in the same place at the same time.

In some embodiments, users may tag images in their collections with persons from their social network. In such embodiments, a user may manually select an image and create a tag that identifies a friend in the image. Some such embodiments may allow the user to point to the face and attach the tag to a location on the image. Such tags may be considered reliable indicators and given higher weight than other metadata.

Other highly weighted factors may be very close proximity in space and time. Very close timestamps and physical location information may indicate that two users were at the same time and place. In some embodiments, an image may include a point from which an image was taken as well as a direction that a camera was facing when the image was taken. When such metadata are available, the overlap of the area covered by two images may be evidence of an event.

Some images may be tagged with various descriptors that are manually added by a user. For example, an image may be tagged with "Anna's Birthday Party" or "Tech Conference". When images from both image collections are similarly tagged, the tags may be good indicators of an event.

The matches may be analyzed using image analysis to identify common events. For example, a facial image match between images in both collections may be a good indicator of an event attended by and captured by both users. A facial image match may be further confirmed by similar background image areas and by clothing analysis of people associated with the matched faces.

When identifying a common event, different combinations of factors may be used in different situations and different embodiments. For example, an event may be determined by image analysis alone in some cases, even when the metadata do not correlate. For example, one user may purchase a camera device and may never correctly set the time and date in the camera, or may have the time set to a different time zone than the other user. In such a case, the timestamp metadata may be incorrect, but the image analysis may identify a common event.

In another example, the metadata may identify a common event even though the image analysis may not identify any common faces, background, or other similarities.

Different embodiments may have different thresholds for identifying an event. In a typical social network use of embodiment 700, the analysis may be performed to automatically apply tags to images based on the events. In such an embodiment, a higher degree of certainty may be desired so that incorrect tags are not introduced into the image collection as noise. In another use, the matching may be used to identify possible events that a user may manually examine to determine if an event actually did occur. In such a use, the threshold to determine an event may have a much lower degree of certainty than in the other use case.

If an event is not determined in block 712, the process may return to block 708 to process another match.

If an event is identified in block 712, all images associated with the event may be identified in block 714. A metadata tag may be defined for the event in block 716, and the tag may be applied to the images in block 718.

The images associated with the event may be determined by identifying images that are related to or share common metadata or other features with the matched images. For example, two images may be matched, one from either image collection. Once those images are matched, any related images to the matched images within their respective collections may be identified in block 714.

The metadata tag in block 716 may be generated by scanning the related images to determine if an event tag is associated with any of the related images. For example, one of the images that was gathered in block 714 may be tagged with an event tag, such as "Anna's Birthday". That tag may then be applied to all of the related images in block 718.

In some embodiments, the event tag of block 716 may be an automatically generated event tag that may identify how the match was determined. For example, a match that was determined by common metadata having time and location information may have a tag that includes "Jerusalem, 22Feb2010". Each embodiment may have different mechanisms for determining a tag.

In some embodiments, the tag applied in block 718 may not be visible to a user. Such a tag may be used by a social network to link different image collections together to provide enhanced search or browsing capabilities and may not expose the tag to the user for viewing or modification.

Figure 8:
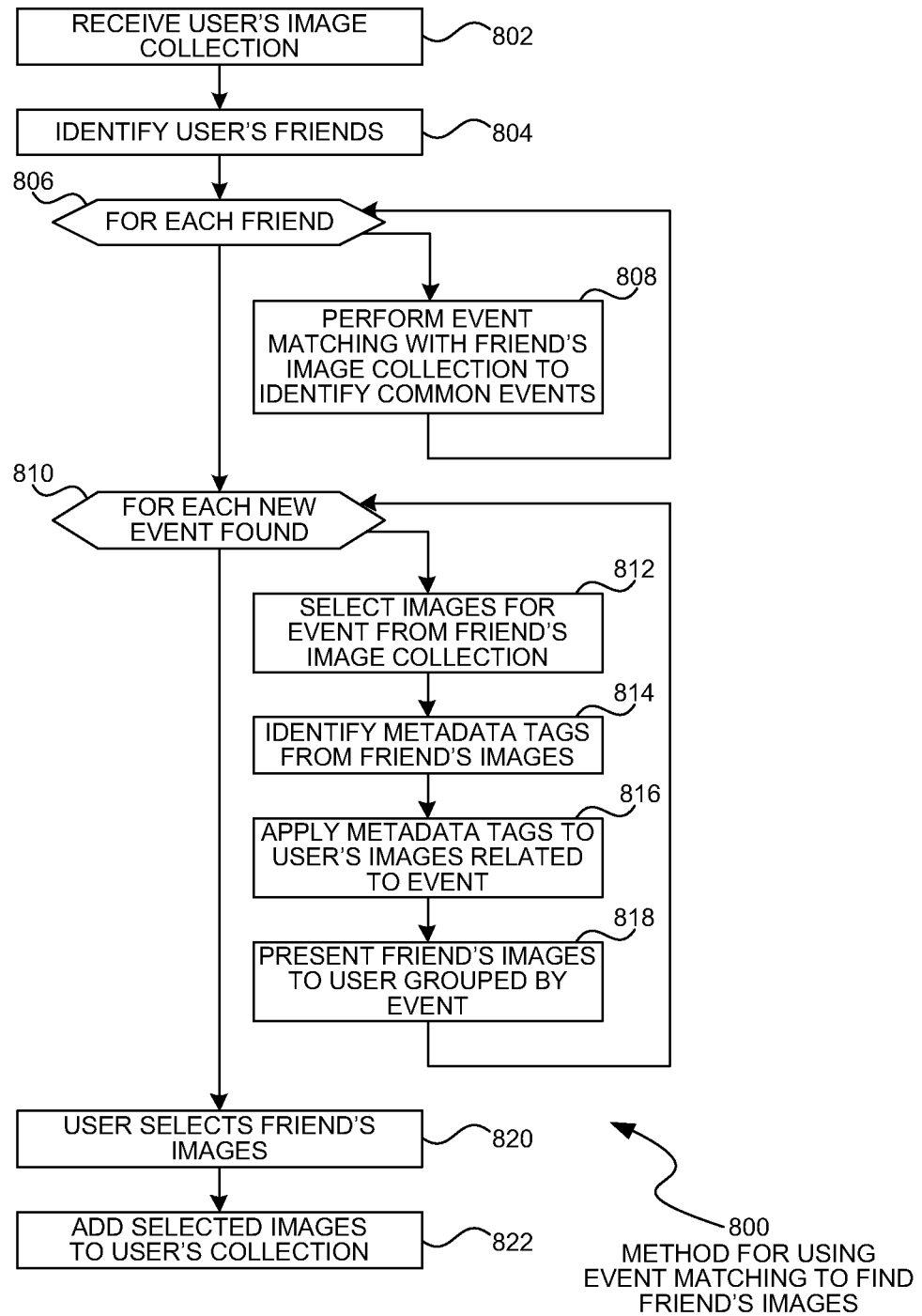
FIG. 8 is a flowchart illustration of an embodiment showing a method for using event matching to find friend's images.

FIG. 8 is a flowchart illustration of an embodiment 800 showing a method for event matching between a user's image collection and those of the user's friends. Embodiment 800 is a simplified example of a use scenario for the event matching method described in embodiment 700.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 compares a user's image collection to those of the user's friends. The comparison may identify events that were shared by the two users and may identify images in the friend's image collection that the first user may like to add to his or her image collection.

Embodiment 800 may be a powerful tool for linking two image collections together in a social network. In some uses, the two users may know that they have attended the same event and may wish to share their images with each other. In other uses, the users may not remember attending the same event or may not realize that both were there. The method of embodiment 800 may enhance the users' interaction by identifying the intersections in their lives and allowing them to share the event through their images.

In block 802, a user's image collection may be received. The user's friends may be identified in block 804 and each friend may be processed in block 806. For each friend in block 806, event matching may be performed in block 808 between the user and the user's friend to identify common events. The event matching may be performed in a similar manner as described in embodiment 700.

Each new event that was found in block 808 may be analyzed in block 810. For each new event in block 810, images may be selected from the friend's image collection in block 812 that match the event. Any metadata from the selected images from the friend's image collection may be identified in block 814 and applied to the user's images that are related to the event in block 816.

The operations of block 814 and 816 may propagate tags and other metadata from the friend's image collection to the user's image collection. In some embodiments, a user may be given an option to approve or disapprove the tagging. The tags and other metadata may enrich the user's image collection by applying useful tags automatically or semi-automatically.

The friend's images may be presented to the user in block 818 and may be grouped by event. An example of a user interface may be illustrated in embodiment 1000 presented later in this specification.

After processing each event in block 810, the user may browse the friend's images and select one or more of the friend's images in block 820. The selected images may be added to the user's image collection in block 822.

Figure 9:
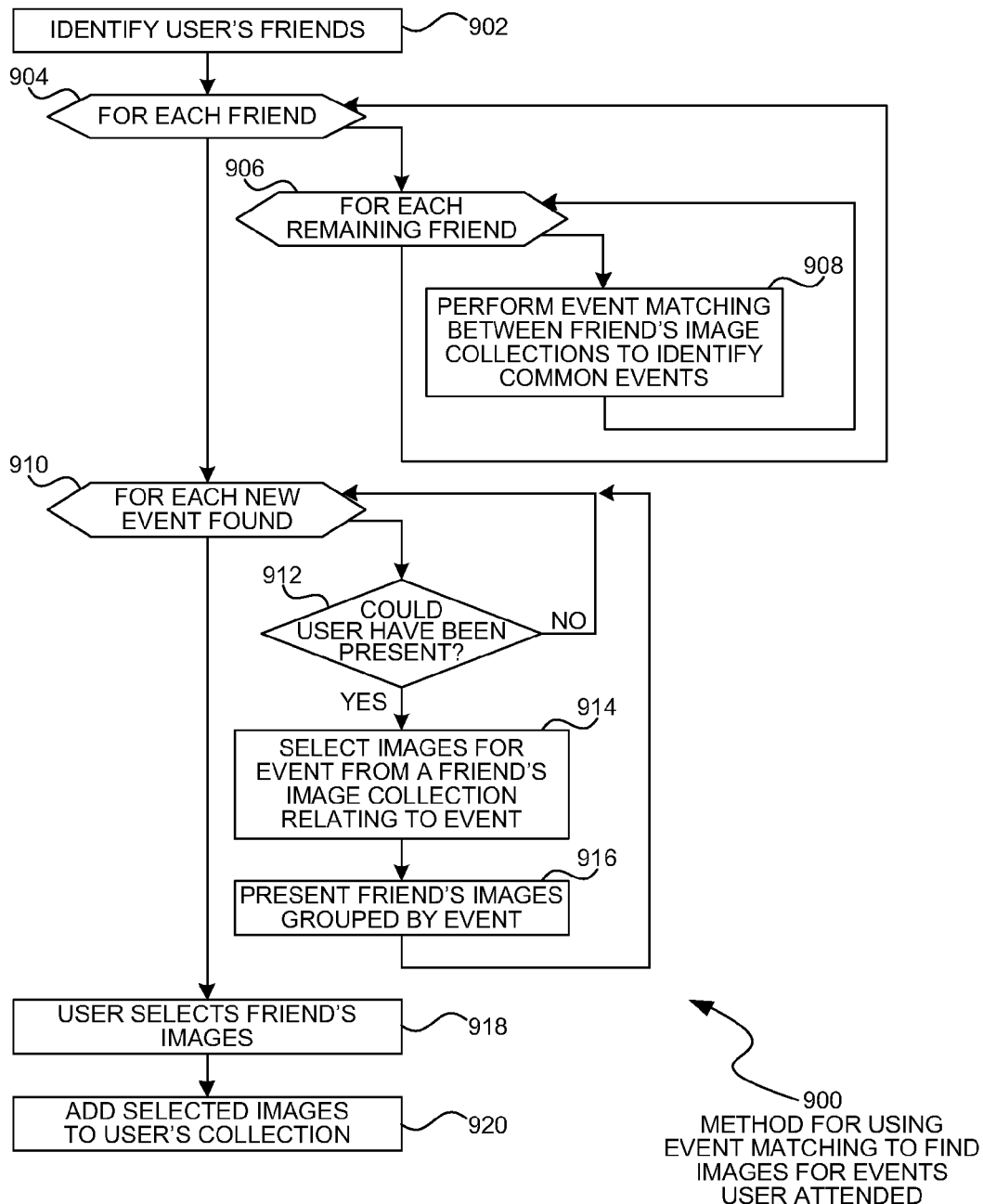
FIG. 9 is a flowchart illustration of an embodiment showing a method for using event matching to find images for events a user attended.

FIG. 9 is a flowchart illustration of an embodiment 900 showing a method for event matching between pairs of a user's friends. Embodiment 900 is a simplified example of a use scenario for the event matching method described in embodiment 700.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 compares two of a user's friend's image collections to identify events that can be inferred from two of the user's friends. Images from the inferred events may be presented to the user and the user may add those images to the user's image collection.

Embodiment 900 may be useful in a social network scenario where a user may or may not be present at an event and may wish to view images of the event and may add some of those images to the user's image collection. For example, grandparents who are unable to attend a grandchild's party may wish to see images of the party. The party may be inferred by analyzing image collections from two or more people that attended the party. By inferring the event from analysis of the image collections, all of the relevant images to the event may be gathered and presented to the grandparents for them to enjoy.

Embodiment 900 operates in a similar manner as embodiment 800, however the image collections used for the event matching may be pairs of collections from the user's friends as opposed to comparing a user's collections to those of his or her friends.

A user's friends may be identified in block 902 and placed in a list. The friends may be identified through a social network. Each friend may be processed in block 904. For each friend in block 904, each remaining friend on the list of friends may be analyzed in block 906. The remaining friends are those friends for which an image collection has not been processed. For each remaining friend in block 906, an event matching process may be performed between the two friend's image collections in block 908 to identify common events. The process of blocks 904 and 906 may be arranged so that each pair of friends may be processed to identify common events.

Each common event may be processed in block 910. For each common event in block 910, some embodiments may include verification in block 912 to determine if the user could have been present.

The verification of block 912 may be used to prevent showing an event to which the user was not invited. For example, two of a user's friends may get together for a night on the town and may not invite the user. To prevent the user from being insulted, some embodiments may include verification such as block 912 to prevent the user from finding out that the event occurred. In other embodiments, such as with the example with the grandparents above, the verification of block 912 may not be included or may be overridden.

In some social networks, a user may be able to select whether or not to share the events with other users, and may be able to select which users may view their common events and which users may not.

In block 914, images from the friend's image collection may be selected from the common event and presented to the user in block 916 grouped by the event. After processing all the common events in block 910, the user may browse and select images in block 918 and may add selected images to the user's collection in block 920.

Figure 10:
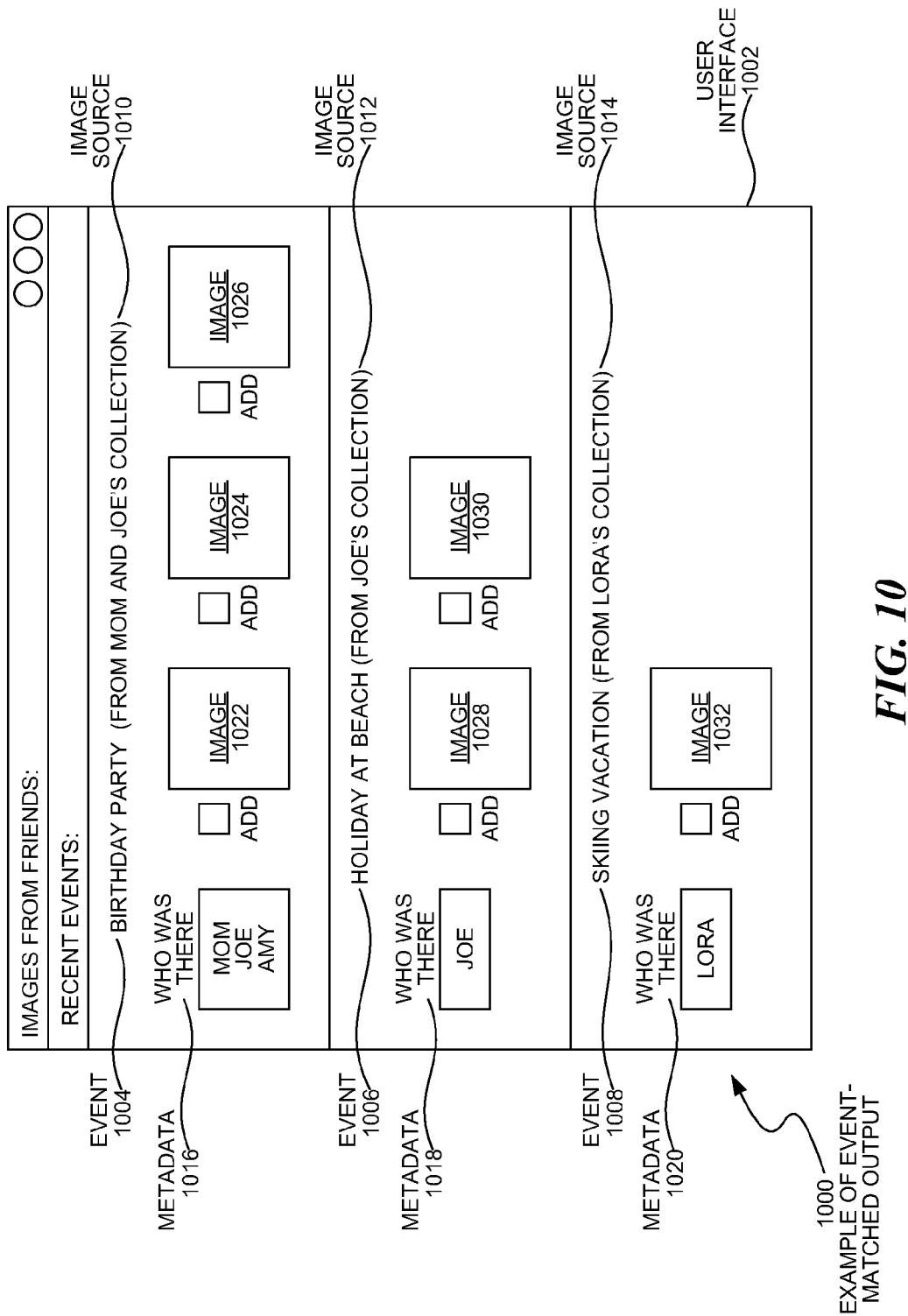
FIG. 10 is a diagram illustration of an example embodiment showing a user interface with event-matched output.

FIG. 10 is a diagram illustration of an example embodiment 1000 showing a user interface with results from an event matching analysis. Embodiment 1000 is a simplified example of a user interface that may be used to present the results of an event matching analysis to a user, such as the event matching analysis of embodiments 800 or 900.

A user interface 1002 may display the results of an event matching process. In the user interface 1002, results from three events are illustrated. Event 1004 may have a tag "Birthday Party", event 1006 may have a tag "Holiday at Beach" and event 1008 may have a tag "Skiing Vacation". The various tags may be identified from tags defined from the image collections of the friends. In some cases, the tags may be determined from the user's images that match the detected events.

Each event may be presented with a source for the images. For example, event 1004 may have an image source 1010 of "From Mom's and Joe's Collection". Event 1006 may have an image source 1012 of "From Joe's Collection", and event 1008 may have an image source 1014 of "From Lora's Collection". The image sources may be created using the user's labels for the user's friends.

The user interface 1002 may also include various metadata relating to the event. For example, event 1004 may be presented with metadata 1016 that indicates which of the user's friends were determined to be at the event. Similarly, event 1006 and 1008 may have metadata 1018 and 1020, respectively.

Each event may have a selection of images presented. Event 1004 is shown with images 1022, 1024, and 1026. Event 1006 is shown with images 1028 and 1030, and event 1008 is shown with image 1032. Next to each image may be a button or other mechanism by which a user may select one or more images to add to the user's image collection.

The user interface of embodiment 1000 is merely one example of some of the components that may be presented to a user as a result of image matching analysis, such as event matching. The user interface may be a mechanism by which a user may browse the results of a match analysis and perform operations on the results.

Figure 11:
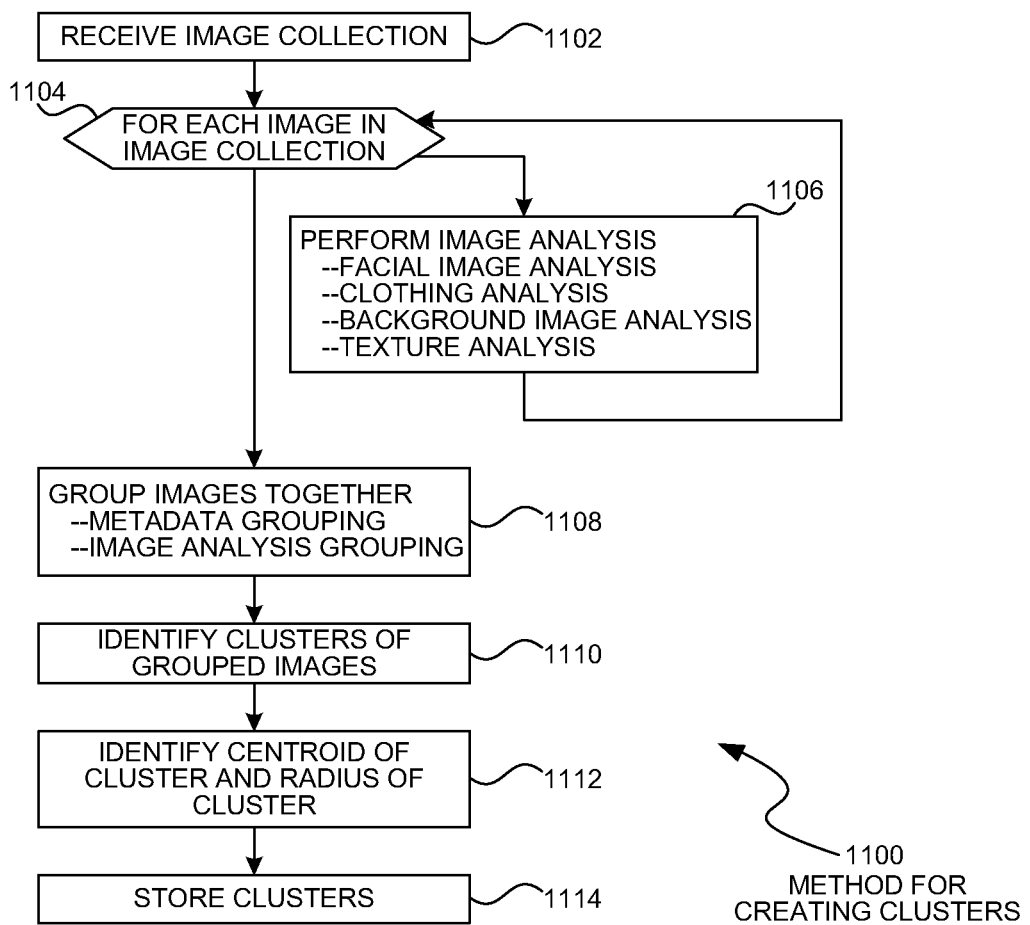
FIG. 11 is a flowchart illustration of an embodiment showing a method for creating clusters.

FIG. 11 is a flowchart illustration of an embodiment 1100 showing a method for creating clusters that maybe used for matching images. Embodiment 1100 is a simplified example of one method by which clusters may be created by analyzing a single image collection and grouping images. The clusters may be used in image comparison analyses and metadata comparison analyses.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1100 may illustrate a simplified method for creating clusters of images. A cluster may be a group of images that may share common features, and may be useful in grouping faces as well as grouping images as a whole.

A cluster may be created by identifying a vector that represents the image and by grouping the vectors together. A cluster may have a centroid and radius, and numerical comparisons may be made between an image and the cluster to determine a 'distance' between the image and cluster to determine a match.

An image collection may be received in block 1102 and each image in the image collection may be analyzed in block 1104. In embodiments where facial recognition is used, the images may be face objects that may contain only the facial features of people cropped from larger images. In such embodiments, the analysis may create a vector that represents the face object. In other embodiments, the entire image may be analyzed to create an image vector.

The image may be analyzed in block 1106 to create an image vector. The image vector may contain numerical representations of various elements of the image, including facial image analysis, clothing analysis, background image analysis, and texture analysis.

In some embodiments, the analysis of block 1106 may create several image vectors. For example, an image having two faces may be represented with two image vectors representing the faces, two image vectors representing the clothing of the two people, and one or more vectors representing background images or various textures in the image.

After each image is analyzed in block 1104, the images may be grouped together in block 1108. The grouping may be using both metadata grouping and image analysis grouping. One mechanism for grouping may be to group images together on independent or orthogonal grouping axes for each metadata category or type of image analysis. For example, one grouping axis may be established for facial image analysis. On such an axis, all facial image representations or vectors may be grouped. Separately, each image may be grouped according to different metadata, such as timestamp or location.

Within each axis, clusters may be identified in block 1110. The definition of a cluster may be controlled using a threshold that may limit clusters to tight groupings of images. The clusters may be used to represent actual matches of images with a high degree of certainty so that other operations, such as image comparisons and ranking may have a high degree of certainty.

Each axis on which the images are grouped may have a different threshold for identifying a cluster. For example, facial image matching may have a relatively tight threshold so that only matches with very high degree of similarity may be considered a cluster. Conversely, images that are matched by background image analysis may have a less restrictive threshold so that a wider range of images may be grouped.

Each cluster may have a centroid and radius calculated in block 1112. The centroid and radius may be used to determine matches when other images are compared to the image collection. The clusters as well as the centroid and radius may be stored in block 1114.

Figure 12:
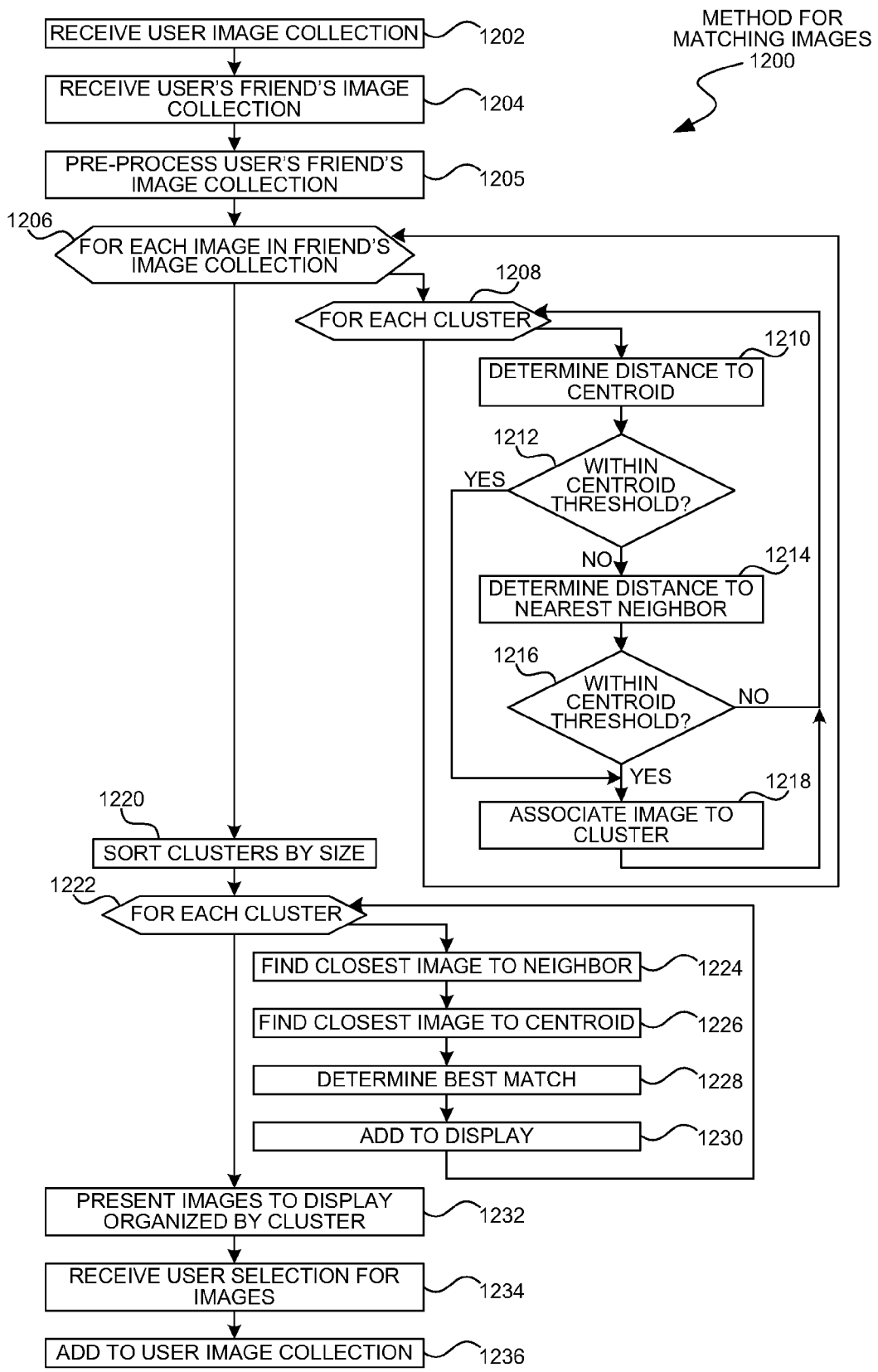
FIG. 12 is a flowchart illustration of an embodiment showing a method for matching images using clusters.

FIG. 12 is a flowchart illustration of an embodiment 1200 showing a method for matching images using centroid and radius analysis of clusters. Embodiment 1200 may illustrate one method by which the analyzed images of embodiment 1100 may be used to identify matches between a user's image collection and a friend's image collection, then to select the most appropriate or best match to display to the user.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A user's image collection may be received in block 1202, and a friend's image collection may be received in block 1204. The user's friend's image collection may be pre-processed in block 1205. An example of a pre-processing method may be embodiment 500. The pre-processing of embodiment 500 may apply to facial image analysis, and may be extended to background image analysis, texture analysis, color histogram analysis, clothing analysis, and other image analysis pre-processing.

The pre-processing of block 1205 may correspond to any analysis performed prior to clustering of the user's image collection.

Each image in the friend's image collection may be analyzed in block 1206. For each image in block 1206, each cluster associated with the user's image collection may be analyzed in block 1208.

As described in embodiment 1100, each image collection may contain multiple clusters in multiple orthogonal axes. Each cluster may represent an important aspect or element of the user's image collection, and those aspects may be used to compare with the images from the friend's image collection.

For each cluster in block 1208, a distance from the analyzed image to the nearest cluster may be determined in block 1210. If the distance is within a centroid matching threshold in block 1212, the image may be associated with the cluster in block 1218.

If the distance is not within the centroid matching threshold in block 1212, a distance to the nearest neighbor may be determined in block 1214. If the distance to the nearest neighbor is not within the neighbor threshold in block 1216, no match is determined.

The nearest neighbor may be an image that is within the cluster. The nearest neighbor evaluation may identify images that fall outside of the cluster but very near one of the images that has been grouped with the cluster. In a typical embodiment, the neighbor threshold may be small when compared to the centroid threshold.

After analyzing all of the images in the friend's image collection in block 1206, the friend's images may be selected for presentation to the user.

The user's clusters may be ranked by size in block 1220. The ranking may be used as a proxy for importance to the user. Each cluster may be evaluated in block 1222. For each cluster in block 1222, the matched images may be compared to the clusters to find the closest image to a neighbor in block 1224 and to a cluster centroid in block 1226. The best match may be determined in block 1228 and added to a user interface display in block 1230.

The process of blocks 1220 through 1230 may identify those matches that may be the most relevant to the user as well as the most likely to be good matches. The relevance may be determined by the ranking of the clusters derived from the user's image collection. The best matches may be those images that are nearest to the centroid of a cluster or very near to another image, which may be represented by the nearest neighbor.

Image matching may be prone to noise and many image matching algorithms may result in false positive results, where an image is incorrectly matched. In a social networking application that has image matching, user satisfaction with the matching mechanism may be higher when the user is presented with quality matches.

The process of blocks 1220 through 1230 may select the best match from the available matches to present to the user. Such a process may select a representative match for each cluster and present each match to the user, enabling the user to view a wide variety of matches.

After selecting the images, the images may be presented to the user organized by cluster in block 1232. The user may browse and select images in block 1234 and may add the images to the user collection in block 1236.

In some embodiments, the user may be able to drill down into the matches for a particular cluster to view additional matches. In such a case, the process of blocks 1220 through 1230 may be used to organized and select the most appropriate images from the subset of images matching the particular cluster.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
receiving a first collection comprising images, said first collection being associated with a first user of a social network;
receiving a second collection comprising images, said second collection being associated with a second user of a social network;
analyzing said first collection to create clusters of images, wherein each cluster represents a facial representation of a person in the first user's social network;
ranking the clusters based on cluster size;
applying the cluster rankings to prioritize persons associated with the clusters, wherein the rankings reflect a relative importance of each person to the first user;
identifying cluster matches from said second collection by determining a similarity between each of said images in said second collection and each of said clusters; and
displaying said cluster matches to said first user.

2. The method of claim 1 further comprising:
presenting an option to said first user to add at least one of said cluster matches to said first collection.

3. The method of claim 2 further comprising:
determining a relationship between said first user and said second user, said relationship comprising permission for said first user to receive images from said second user.

4. The method of claim 3, said permission comprising a mutual sharing agreement between said first user and said second user.

5. A storage device for storing computer readable instructions, the computer readable instructions when executed by one or more processing devices perform a method comprising:
receiving a first collection of images, the first collection of images associated with a first user;
receiving a second collection of images, the second collection of images associated with a second user;

analyzing the first collection of images by determining a representation vector for each of the images, the representation vectors comprising image metadata and non-image metadata, wherein each representation vector includes a facial vector representing a face of a person in the first user's social network;

identifying clusters of images having similar representation vectors;

ranking the clusters based on size;

applying the cluster rankings to prioritize persons associated with the clusters, wherein the rankings reflect a relative importance of each person to the first user; and comparing the images in the second collection with the clusters of images to identify cluster matches.

6. The storage device computer of claim 5, wherein the non-image metadata includes location information.

7. The storage device of claim 5, wherein the non-image metadata includes a timestamp.

8. The storage device of claim 5, wherein the image metadata includes image analysis of a background element to create an image vector.

9. The storage device of claim 5, wherein the method further comprises determining a centroid for each of the clusters and comparing the cluster matches to the corresponding cluster centroid to determine a most relevant match.

10. The storage device of claim 5, wherein the method further comprises displaying the cluster matches in a user interface.

11. The storage device of claim 5, wherein the method further comprises determining a label for each cluster and displaying the label with a corresponding cluster match.

12. The storage device of claim 11, wherein the label is determined from a tag associated with a member of one of the clusters of images.

13. The storage device of claim 11, wherein the label is determined from one of the cluster matches.

14. The storage device of claim 5, wherein the method further comprises adding one or more cluster matches to the first collection of images.

15. A method comprising:

receiving a first collection of images, the first collection of images associated with a first user;

analyzing the first collection of images by determining a representation vector for each of the images, each representation vector comprising a facial representation of a person in the first user's social network;

identifying clusters of images having similar representation vectors;

ranking the clusters based on size; and applying the cluster rankings to prioritize persons associated with the clusters, wherein the rankings reflect a relative importance of each person to the first user.

16. The method of claim 15, wherein prioritizing one or more persons in the first user's social network in one or more applications based on the cluster rankings comprises presenting via a newsfeed to the first user information associated with one or more persons in the first user's social network based on the cluster rankings.

17. The method of claim 16, wherein the newsfeed includes status updates.

18. The method of claim 15, further comprising receiving a second collection of images associated with a second user, and comparing the images in the second collection with the clusters of images to identify cluster matches.

19. The method of claim 18, further comprising displaying cluster matches to the first user.

* * * * *